Dec. 29, 1953     R. N. CARPENTER     2,664,093
DENTAL FLOSS HOLDER
Filed Oct. 23, 1951
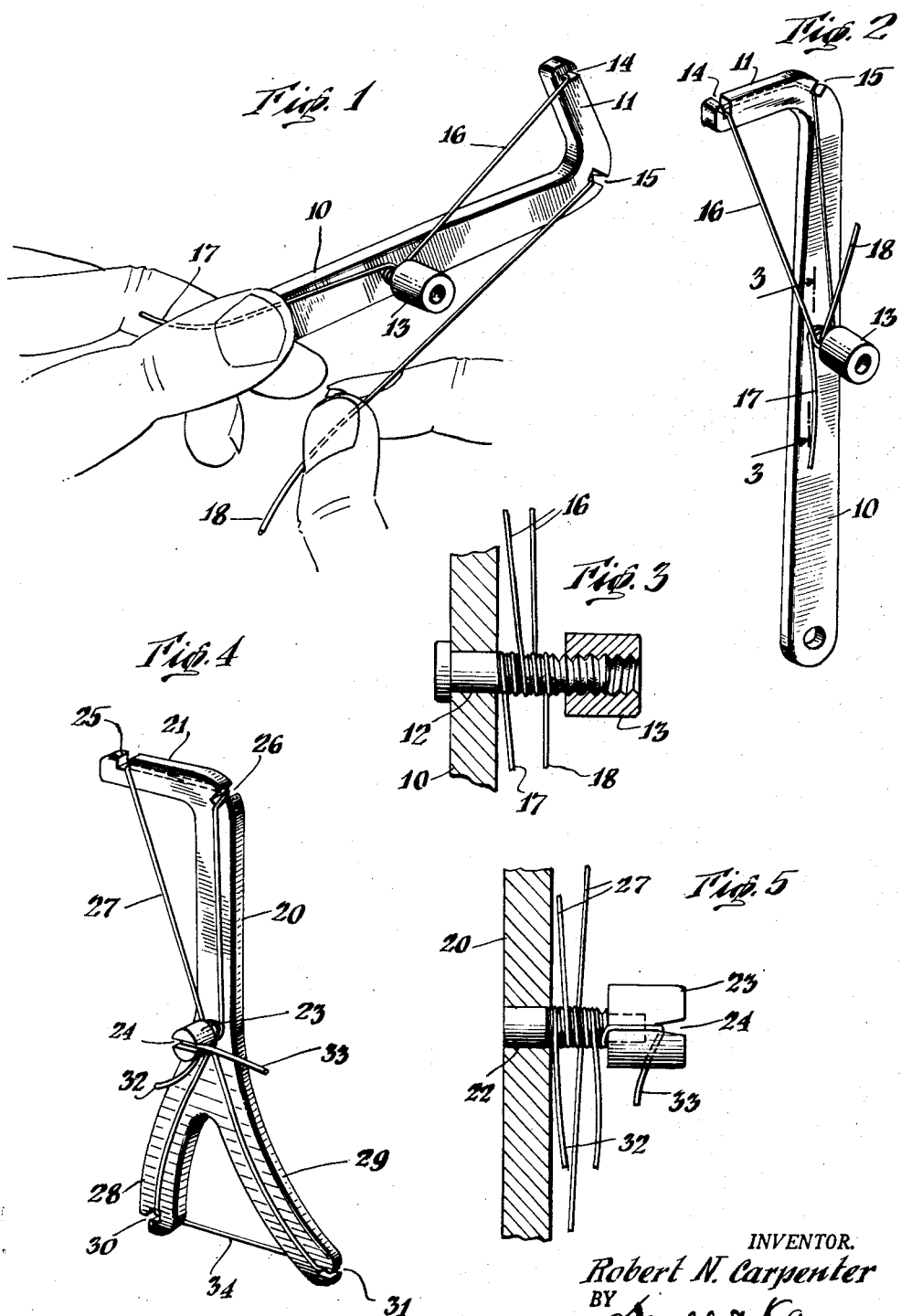
INVENTOR.
Robert N. Carpenter
BY Duell & Kane
ATTORNEYS Patented Dec. 29, 1953

2,664,093

UNITED STATES PATENT OFFICE 2,664,093

DENTAL FLOSS HOLDER

Robert N. Carpenter, Roslyn, N. Y.

Application October 23, 1951, Serial No. 252,610

5 Claims. (Cl. 132—91)

This invention relates to an improved dental floss holder for conveniently manipulating and holding dental floss in place while it is being used.

It is an object of this invention to provide an improved dental floss holder to which the dental floss may be readily applied and removed in a minimum amount of time; which holds the floss in proper position to be conveniently used in cleaning the teeth; and which securely retains the dental floss in place while it is being used.

In the accompanying drawing—

Fig. 1 is a perspective view of an improved dental floss holder embodying my invention showing the floss in the process of being applied thereto;

Fig. 2 is another perspective view from a different angle of the holder;

Fig. 3 is a detailed sectional view in the direction of the arrows on the line 3—3 of Fig. 2 of the retaining member of the dental floss holder for securely retaining the ends of the floss in place;

Fig. 4 is a perspective view of a modified form of dental floss holder; and

Fig. 5 is a detailed view of the retaining member of the modified dental floss holder.

My improved dental floss holder comprises a rigid frame member with portions disposed outwardly or at an angle in respect to the main body of the frame and having improved floss engaging and floss retaining portions, so arranged that the floss may be threaded thereto with the operating portion of the floss spanning between two of the frame portions and with portions of the length of floss on one side of the frame and a portion of the length of the floss passed through transverse notches to and from the other side of the frame. Thus, in Figs. 1 to 3 it will be seen that I have provided a suitable frame member made of any desired material such as molded plastic, vulcanized rubber, metal or the like having a handle portion 10 of a size and shape to be conveniently grasped in the hand and a head portion 11 integrally formed with the handle portion and projecting laterally.

An improved retaining portion for the ends of the dental floss in the form of threaded stud 12 engaged by the nut 13 is provided on the handle portion of the frame, and improved engaging means in the form of notches 14 and 15 are provided in the head portion, which notches run transversely across the engaging portions of the frame at approximately right angles to the general plane of the frame.

The stud member 12 is secured to the handle so that it will not rotate with respect to the handle, which may be accomplished by adhesive or friction or having that portion of the stud inside the body of the frame angular in shape, or said stud may be made an integral part of the frame. The projecting portion of the stud may be round or angular and so as to receive the threaded nut 13. As will be hereinafter explained the helical or angular grooves forming the threads serve to help retain the floss in position and the nut 13 can be tightened to further retain the floss against release or slippage.

The notch 14 is provided on the upper or outer surface of the head 11 of the frame and near the free end thereof. The notch 15 is formed on the outer surface of the frame adjacent the point of juncture between the head and the main portion of the frame and should be disposed at an angle projecting outwardly with respect to the free end of the head 11 so as to facilitate the threading of the floss through the notches and so as to more securely prevent accidental release of the floss.

In using the device the free end 17 of a length of dental floss is held in position by pressing it with the left hand against the frame as shown in Fig. 1. The floss is then pulled in tension and wrapped several turns around the stud 12 preferably in a clockwise direction (and for this purpose 2 or 3 turns will suffice) and is thence extended in a span 16 to and through the notch 14. The floss is then drawn along the opposite side of the frame in contact with the head 11, through notch 15 to the forward face of the frame thence along a portion of the frame back to the stud 12 where the end 18 is wrapped around the stud, preferably in a clockwise direction, for several turns, and the nut 13 tightened to prevent the end 18 from unwinding or slipping.

Throughout the winding and threading operation, tension is applied to the floss, inasmuch as the threads on the stud, in the form of helical or diagonal angular grooves, thereby resisting release or slippage thereof. When the end 18 of the floss has been wrapped around the stud 12 in the manner described, the nut 13 is tightened so as to securely hold the floss against release or unwinding. The tightening of the nut serves to reinforce this wedging action and insures against any undesirable slippage. A slight roughing of the threads on the stud will increase its holding function.

When the floss has thus been threaded in place, the user grasps the dental floss holder in his hand and the device can be readily manipulated so that the span 16 of the dental floss can be inserted between the teeth. While in use, the floss will be held tightly in place with the span held in the desired taut condition.

When it is desired to remove and replace the dental floss, the nut 13 can be loosened, then the end 18 of the floss unwound from stud 12 and thence released from notches 15 and 14 and finally the opposite end 17 unwound from the stud.

The device is suitable for use with the conventional thread or cord type of dental floss or with ribbon or band type of floss and it should be understood that the term dental floss is used generically to indicate any type of floss.

In Figs. 4 and 5 I have shown a modified type of construction in which the frame is provided at one end with a laterally disposed head as is shown in Figs. 1 and 2 and at the opposite end with a forked portion providing a further span of dental floss which may be more conveniently manipulated for certain purposes. Thus, as shown the frame has a handle portion 20 and a head 21 similar to the head 11 and having notches 25 and 26 corresponding with the notches 14 and 15.

A modified type of retaining member is provided in the handle portion of the frame in the form of the stud 22 having the fixed enlarged head 23, either formed integrally with the end of the stud or fixedly secured thereto. The stud member 22 is secured to the body of the frame so that it will not rotate with respect to the handle 20, or may be made an integral part of the frame. As shown in Fig. 5, the shank of the stud 22 is provided with helically or angularly disposed retaining grooves, preferably roughened, such as helical threads. The outer surface of the head 23 is formed with a tapered groove or notch 24 for receiving one end of the dental floss.

A variation of this modified type of retaining member has the shank of the stud provided with angularly disposed grooves, notches, or protuberances, angled or diagonally positioned in such manner as to perform a camming or wedging function similar to the aforesaid helical or angular grooves. When tension is applied to the floss when being wound around the shank a slight roughening of the said grooves, notches or protuberances on the stud will increase its holding function. The said diagonally positioned irregularities are adaptable to be used on studs, the cross sections of which are either round, oblong, hexagonal or similar shape. Another variation of this modified type of retaining member is to have the tapered groove or notch shown at 24 (Figs. 4 and 5) instead of being a part of the head of the stud, incorporated in or on the frame, where it would serve the same purpose as on the head of the stud, or by using a spring clip or cleat attached to the head of the stud or the frame, which is an alternate utilization of this method of holding the ends of the dental floss, viz: a stud having a shank with diagonal or helically formed grooves or irregularities for holding the windings of the dental floss used in combination with a jamming holding means for holding the last end of the floss in place to prevent the unwinding and loosening of the windings of the floss on the shank of the stud.

The forked end of the frame has two prongs 28 and 29 (Fig. 5) which diverge outwardly from each other and at the same time curve rearwardly as shown. Near the free ends the outer surface of the prongs 28 and 29, a pair of engaging notches 30 and 31 are provided.

In using the modified form of dental floss holder, the free end 32 of a length of dental floss may be grasped against the frame by the left hand of the user and the dental floss thence wound for several turns around the stud 22 and drawn upwardly under tension in a span 27 to the notch 25 thence through the notch and along the other side of the head portion 21 of the frame to and through the notch 26 to the forward face of the frame and down the handle portion to the stud 22, when it is once again wound for several turns in a clockwise direction around the stud. The floss is thence drawn along the outer surface of the prong 28 and thence through notch 30 to the other side of the frame and drawn in a span to the notch 31 when it is drawn through the notch 31 to the outer surface of the frame and along prong 29 back to the retaining stud 22. The end 33 of the dental floss is then wound around the stud and drawn tightly through the tapered notch 24, which, in combination with the wedging function caused by the helical or angular grooves or threads of the stud, serve to hold the floss against slippage or release. After the floss has thus been threaded to the frame, the handle is grasped by the user and either the span 27 or the span 34 may be inserted between the teeth depending on the convenience of the user. Under certain conditions, the span 34 may more conveniently be used between the molars or rear teeth.

In threading the floss through the frame, it should be pulled in tension and the helical or angular grooves on the stud perform a wedging or camming action to retain the floss in place as in the first form of my invention.

In the modified form of my invention it should be understood that instead of threading the dental floss on both ends of the holder either one of the ends may be separate threaded. In threading either of the ends the procedure will be substantially as heretofore described.

The novel use of transverse notches as herein described for stringing dental floss on a frame, and the holding means herein described for holding the ends of the dental floss, are also adaptable for use on similar frames of varying shapes that may be used in like manner. The retaining member shown in Fig. 5 is suitable for use with the frame shown on Fig. 1 and the retaining member shown on Fig. 3 is suitable for use with the frame shown on Fig. 4.

It will thus be seen that I have provided an improved dental floss holder which may be readily threaded in a simple and convenient manner; which holds the floss in the proper desired position for use; and which retains the floss against accidental slippage or release when in use. While I have shown and illustrated two embodiments of my invention it will be appreciated that modifications may be made without departing from the spirit of the invention as set forth in the accompanying claims.

I claim:

1. A dental floss holder for holding dental floss in place while in use comprising: a rigid frame having a longitudinal handle portion and a head portion projecting laterally from one end thereof, said head portion having a transverse open notch on the outer surface thereof near its free end and another transverse open notch on the outer surface thereof near the point of juncture with the handle portion and disposed at an angle extending away from the free end of the head, both of said notches being formed at approximately right angles to the plane of the body of the frame, and a floss retaining member for retaining the free ends of the length of floss formed at an intermediate portion of the handle portion on one side thereof whereby a length of floss may be threaded from the retaining member on one side of the frame in a span to the notch at the free end of the head portion, thence through said notch and along the other side of the head portion to the notch at the point of juncture between the head and handle portions thence back through this notch to the first side of the frame and along the handle portion back to the retaining member.

2. A dental floss holder for use in holding dental floss in place while in use as set forth in claim 1 in which the floss retaining member comprises a stud having angularly formed grooves in the sides thereof.

3. A dental floss holder for holding dental floss in place while in use as set forth in claim 1 in which the floss retaining member comprises a threaded stud having a nut threaded thereto.

4. A dental floss holder for holding dental floss in place while in use as set forth in claim 1 in which the floss retaining member comprises a stud having a shank with angularly disposed grooves formed therein and a head fixedly secured at the outer end thereof and formed with a tapered notch.

5. A dental floss holder for holding dental floss in place while in use as set forth in claim 1 in which the handle is provided with a forked portion at the end opposite the head portion and the two prongs of the forked portions have floss engaging open notches formed adjacent the outer ends thereof fashioned transversely across the free ends of the forked portions whereby a length of dental floss may be secured to the floss retaining member and extended along one prong to and through the notch to the other side of the frame, thence in a span to the other notch and back through the notch to the side of the frame to which the said floss retaining member is attached and along the other prong back to the floss retaining member.

ROBERT N. CARPENTER.

References Cited in the file of this patent

UNITED STATES PATENTS

| Number | Name | Date |
|---|---|---|
| 844,181 | Overbaugh | Feb. 12, 1907 |
| 1,217,264 | Baxter | Feb. 27, 1917 |
| 1,488,214 | Mason | Mar. 25, 1924 |
| 1,970,575 | Reitzel | Aug. 21, 1934 |
| 2,467,221 | Pastl | Apr. 12, 1949 |